United States Patent

Flory et al.

Patent Number: 5,478,656
Date of Patent: Dec. 26, 1995

[54] CATIONIC UREA/FORMALDEHYDE RESINS, THEIR PREPARATION AND THEIR USE IN THE PAPER INDUSTRY

[75] Inventors: Klaus Flory, Leimen; Andreas Stange; Michael Kroener, both of Mannheim; Norbert Sendhoff, Gruenstadt, all of Germany

[73] Assignee: BASF Aktiengesellschaft, Ludwigshafen, Germany

[21] Appl. No.: 408,408

[22] Filed: Mar. 22, 1995

Related U.S. Application Data

[62] Division of Ser. No. 775,928, filed as PCT/EP90/01399, Aug. 22, 1990.

[30] Foreign Application Priority Data

Aug. 23, 1989 [DE] Germany .......................... 39 27 812.3

[51] Int. Cl.⁶ ..................................................... B32B 27/42
[52] U.S. Cl. ...................... 428/530; 528/230; 528/246; 528/248; 528/252; 528/254; 528/256; 528/259; 528/266; 528/392; 528/423; 428/526
[58] Field of Search ...................... 528/230, 246, 528/248, 252, 254, 256, 259, 266, 392, 423; 428/526, 530

[56] References Cited

U.S. PATENT DOCUMENTS

| 3,275,605 | 9/1966 | Eastes et al. | 528/263 |
| 3,752,781 | 8/1973 | Muzyczko et al. | 524/843 |
| 4,663,379 | 5/1987 | Fischer et al. | 524/376 |

Primary Examiner—Samuel A. Acquah
Attorney, Agent, or Firm—Oblon, Spivak, McClelland, Maier & Neustadt

[57] ABSTRACT

Cationic urea/formaldehyde resins are obtainable by condensing urea and formaldehyde in a molar ratio of from 1:1.5 to 1:3 in the presence of polymers which contain not less than 1 mol % of polymerized vinylamine units and have Fikentscher K values of from 5 to 300, in an amount of from 5 to 50 g per mole of urea in the end product, where the mixture is first a) precondensed at a pH of from 8 to 14, then acidified and b) condensed at a pH of from 1 to 5 until gel formation begins, c) then from 0.3 to 1.5 moles of formaldehyde are added per mole of urea used, d) post-condensation is carried out and e) the resin solution is subsequently neutralized. The resins thus obtained are used in papermaking as assistants for increasing the dry and wet strength of paper and result in less dulling of the whiteness of the paper.

12 Claims, No Drawings

CATIONIC UREA/FORMALDEHYDE RESINS, THEIR PREPARATION AND THEIR USE IN THE PAPER INDUSTRY

This is a Division of application Ser. No. 07/775,928 filed on Nov. 6, 1991, which was filed as International Application No. PCT/EP90/01399, filed Aug. 22, 1990.

The present invention relates to cationic urea/formaldehyde resins which contain condensed polymers having vinylamine units, a process for their preparation and their use in papermaking as an agent for increasing the dry strength and wet strength of paper.

U.S. Pat. No. 3,275,605 discloses that urea and formaldehyde can be condensed in the presence of polyamines to give water-soluble resins. The reactants are first precondensed in the alkaline pH range, then condensed in the acidic pH range until gel formation begins, then subjected to post-condensation, for example with formaldehyde, and subsequently neutralized. The products are suitable as agents for increasing the wet strength of paper.

U.S. Pat. No. 3,752,781 discloses a process for the preparation of cationic resins, in which urea is first reacted with polyalkyleneimines, for example polyethyleneimine, with elimination of ammonia to give polyureas, the polyureas are then reacted with urea and the reaction product is methylolated. This gives a cationic resin in the form of an aqueous solution, which is neutralized by adding an acid. Products of this type have not been used to date in the paper industry because they are expensive and not very effective and furthermore lead to pronounced yellowing of the paper.

European Patent 0,123,196 discloses a process for the preparation of water-soluble cationic urea/formaldehyde resins, in which urea and formaldehyde are condensed in a molar ratio of from 1:1.5 to 1:3 in the presence of polyamines, the mixture first (a) being precondensed at a pH of from 8 to 14 and then acidified and (b) condensed at a pH of from 1 to 5 until gel formation begins, then (c) from 0.3 to 1.5 moles of formaldehyde being added per mole of urea used, (d) postcondensation being carried out and the resin solution subsequently being neutralized. From 5 to 50 g of polyethyleneimine which contains from 20 to 15,000 polymerized ethyleneimine units are used as polyamines, per mole of urea in the end product. The water-soluble cationic urea/formaldehyde resins thus obtained are used in papermaking as assistants for increasing the dry strength and wet strength of the paper. However, when the paper webs containing these resins as strengtheners are dried, undesirable elimination of formaldehyde is observed. Formaldehyde elimination during the drying of paper treated with the urea/formaldehyde resins disclosed in U.S. Pat. No. 3,275,605 as wet strength agents is, on the other hand, far greater than in the case of papers which contain condensates of European Patent 0,123,196 as strengtheners.

It is an object of the present invention to provide cationic urea/formaldehyde resins which increase the dry and wet strength of paper and impart to these papers the property of lower formaldehyde emission during drying compared with the conventional condensates based on urea and formaldehyde. The novel resins should furthermore ensure less dulling in papermaking.

We have found that this object is achieved, according to the invention, by cationic urea/formaldehyde resins which are obtainable by condensing urea and formaldehyde in a molar ratio of 1:1.5 to 1:3 in the presence of polymers which contain not less than 1 mol % of polymerized vinylamine units and have K values of from 5 to 300 (determined according to H. Fikentscher in 5% strength aqueous sodium chloride solution at 25° C. and at a polymer concentration of 1% by weight), in an amount of from 5 to 50 g, based on 1 mole of urea in the end product, where the mixture is first a) precondensed at a pH of from 8 to 14, then acidified and
b) condensed at a pH of from 1 to 5 until gel formation begins,
c) then from 0.3 to 1.5 moles of formaldehyde are added per mole of urea used,
d) post-condensation is carried out and
e) the resin solution is subsequently neutralized.

The resulting solutions of cationic urea/formaldehyde resins are used in papermaking as assistants for increasing the dry and wet strength of paper.

Urea and formaldehyde are condensed in a molar ratio of from 1:1.5 to 1:3 in the presence of polymers containing polymerized vinylamine units.

Polymers containing vinylamine units are known, cf. for example U.S. Pat. Nos. 4,421,602, 4,623,699 and 4,255,548 and EP-A-0 216 387. Suitable polymers containing polymerized vinylamine units are advantageously prepared by hydrolysis of homo- and copolymers containing polymerized N-vinylamide units. Such polymers contain the following characteristic structures:

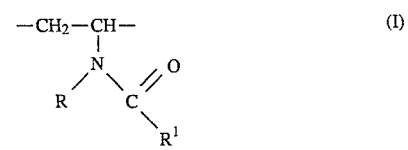

where R and $R^1$ are each H or $C_1$–$C_6$-alkyl.

For the preparation of compounds which exclusively contain structural units of the formula I, for example N-vinylformamide, N-vinylacetamide, N-vinyl-N-methylformamide, N-vinylpropionamide or N-vinylbutyramide is polymerized. Hydrolysis of the compounds having structural elements of the formula I using an acid, e.g. hydrochloric acid, sulfuric acid or phosphoric acid, or in the presence of a base, such as sodium hydroxide solution or potassium hydroxide solution, with elimination of the —CO—$R^1$ group, gives the structure:

where R is H or $C_1$–$C_6$-alkyl.

In the case of 100% hydrolysis of all units of the structure I in the polymer, polyvinylamine is obtained. If only partial hydrolysis is carried out, the polymers prepared from the N-vinylamides contain units of structures I and II. A preferably used N-vinylamide is the compound of the formula

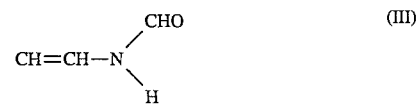

ie. N-vinylformamide. Partially hydrolyzed homopolymers of compounds of the formula III are disclosed in the abovementioned U.S. Pat. No. 4,421,602. As stated above, 100% hydrolysis may be carried out, so that polyvinylamine is formed. Other suitable polymers containing polymerized vinylamine units are compounds which are obtainable by copolymerization of A) from 1 to 99, preferably from 10 to 90, mol % of N-vinylamides and B) from 99 to 1 mol % of vinyl acetate, vinyl propionate, $C_1$–$C_4$-alkyl vinyl ethers, ethylene, esters, nitriles or amides of acrylic acid or methacrylic acid, N-vinylpyrrolidone or mixtures, and subsequent hydrolysis of the amide groups of the structural units I of the polymers to give amino groups of the structure II.

Copolymers of N-vinylformamide with the comonomers stated under B) are preferred. Such copolymers are described in EP-A-0 216 387. In addition to N-vinylformamide, it is possible to use, for example, N-vinyl-N-methylformamide, N-vinylacetamide, N-vinyl-N-methylacetamide, N-vinylpropionamide or N-vinylbutyramide as monomers of component A. In the hydrolysis of copolymers of N-vinylformamide and vinyl acetate or vinyl propionate, it is possible, depending on the reaction conditions, also to hydrolyze the polymerized monomer units B), so that, in the case of the last-mentioned comonomers, the copolymers then additionally contain, for example, polymerized vinyl alcohol units. This hydrolysis may be carried out partially or completely.

The homo- and copolymers containing polymerized vinylamine units have K values of from 5 to 300, preferably from 15 to 150. Particularly preferred polymers are those which contain the structural units of the formula II where R is H and have K values of from 20 to 95.

The polymers containing structural units of the formula II are used in the condensation of urea and formaldehyde in an amount of from 5 to 50 g, preferably from 10 to 30 g, based on 1 mole of urea in the end product.

From 2.0 to 2.5 moles of formaldehyde are preferably used per mole of urea in the preparation of the condensates. The aqueous resin solutions are obtained by first preparing a mixture of the abovementioned components. It is in the form of a clear alkaline solution. Precondensation of the mixture of urea, formaldehyde and polymers containing polymerized vinylamine units in stage a) . . . (sic) carried out at a pH of from 8 to 14, preferably from 9 to 11. In order for a reaction to begin, the reaction mixture is heated to 60°–100° C., preferably 70°–90° C. The precondensation essentially depends on the temperature of the reaction and takes from about 10 minutes to 2 hours. Thereafter, the aqueous solution of the precondensate is acidified and is brought to a pH of from 1 to 5 in process step b). The reaction solution can be acidified using mineral acids or organic acids, for example sulfuric acid, phosphoric acid, hydrochloric acid, formic acid, acetic acid, propionic acid, p-toluenesulfonic acid and benzenesulfonic acid.

In process stage b), the condensation is carried out at a pH of from 1 to 5, preferably from 2 to 4.5, and at from 60° to 100° C., preferably from 70° to 90° C. The condensation is continued until gel formation is observed. Gel formation is detectable by virtue of the fact that thrombi are no longer formed at the stirrer, even at relatively high speeds; instead, the reaction product rises up the stirrer. From 15 minutes to 3 hours are required for the condensation reaction, depending on the temperature, the shorter reaction times being associated with the higher temperatures.

Once a gel has formed, formaldehyde is added to the condensate in process stage c), from 0.3 to 1.5 moles of formaldehyde being added per mole of urea used, and in process stage d) post-condensation is carried out at from 60° to 100° C., preferably from 70° to 90° C. The post-condensation takes from about 10 minutes to 5 hours, depending on the temperature set. In process stage e), the resin solution is neutralized. The neutralization is carried out using, for example, sodium hydroxide solution, potassium hydroxide solution, ammonia, amines, sodium carbonate, potassium carbonate, sodium bicarbonate or ammonium or potassium bicarbonate or a mixture of two or more bases. Sodium carbonate is preferably used for the neutralization. After the neutralization, the ready-to-use aqueous resin solution has a pH of from 6.0 to 7.0.

Aqueous solutions of cationic urea/formaldehyde resins having a solids content of from 20 to 70, preferably from 25 to 45, % by weight are obtained in this manner. The solids content of the solutions can readily be varied by using aqueous formaldehyde solutions of a different concentration or paraformaldehyde in the condensation. The neutral aqueous solutions of cationic urea/formaldehyde resins obtained in the condensation can be used for papermaking directly or, if necessary, after dilution with water. It is also possible to obtain that (sic) resin itself in solid form by distilling off the solvent. The cationic urea/formaldehyde resins are infinitely dilutable with water.

Water-soluble cationic modified urea/formaldehyde resins which, in the form of a 25% strength by weight aqueous solution, have viscosities of from 20 to 1500 mPa.s at 20° C. are obtained. The aqueous resin solutions or the solid products obtained therefrom are used as assistants for increasing the dry and wet strength of paper in papermaking. The resins, in the form of aqueous solutions, are added to the paper stock prior to sheet formation or are applied to a preformed paper sheet with the aid of a size press. The cationically modified urea/formaldehyde resin is applied in amounts of from 0.1 to 5, preferably from 0.5 to 2, % by weight (solids), based on dry fibers. The aqueous resin solutions are preferably added to the paper stock prior to sheet formation. In all fibers used in papermaking, they increase the dry and wet strength of the paper. They are used, for example, in bleached and unbleached pulp, groundwood, waste paper, CTMP and TMP or in mixtures of paper stocks. The advantage of the cationically modified urea/formaldehyde resins over similar prior art agents is that they dull the whiteness of the paper only slightly and exhibit a substantially lower formaldehyde emission during drying of the paper sheet.

The K values were determined according to H. Fikentscher, Zellulosechemie, 13 (1932), 48–64 and 71–74, in 5% strength sodium chloride solution at 25° C. and at a polymer concentration of 1% by weight; $K=k.10^3$. In the Examples which follow, parts and percentages are by weight, unless stated otherwise.

EXAMPLE 1

565 parts (7.5 mol) of formaldehyde, in the form of a 40% strength aqueous solution, 220 parts (3.7 mol) of urea and 190 parts of water were mixed with 39.6 parts of a 42% strength aqueous solution of a partially hydrolyzed homopolymer of N-vinylformamide which contained 26 parts of vinylamine hydrogen sulfate units and 74 parts of vinylformamide units, and the mixture was heated to 70° C. while stirring. The K value of the nonhydrolyzed polyvinylformamide was 30 and the K value of the hydrolyzed polymer was 28.

After the mixture had been stirred for 30 minutes at 70° C., formic acid was added until the pH had been brought to 4.0. At this pH and at 70° C., the reaction mixture was condensed until gel formation began. Gel formation was detectable by virtue of the fact that the reaction mixture rose up the rotating stirrer. Incipient gel formation is associated with a very pronounced increase in the viscosity of the resin solution. The condensation took about 2 hours. After the main condensation, a mixture of 137 parts (1.8 mol) of formaldehyde, in the form of a 40% strength aqueous solution, 30 parts of water and 50 parts of methanol was added, and the pH was brought to 5.8 by adding 20% strength sodium carbonate solution. At this pH, postcondensation was carried out for 1 hour at 70° C. The resin solution was then brought to a pH of 6.2. This gave an aqueous solution, having a solids content of about 30%, of a urea/formaldehyde resin modified with a copolymer containing vinylamine groups and N-vinylamide groups. This aqueous solution of the resin had a viscosity of 86 mPa.s.

COMPARATIVE EXAMPLE

Using the method described in European Patent 0,123, 196, 565 parts (7.5 mol) of formaldehyde, in the form of a 40% strength aqueous solution, 220 parts (3.7 mol) of urea and 190 parts of water were mixed with 50 parts of a 50% strength solution of polyethyleneimime (sic) which contained 35 . . . (sic) of polymerized ethyleneimine units, and the mixture was heated to 70° C. while stirring. After the mixture had been stirred for 30 minutes at this temperature, the pH of the mixture was brought to 4.3 by adding formic acid. At this pH and at 70° C., the reaction mixture was condensed until gel formation began. The condensation took about 2 hours. After the main condensation, a mixture of 151 parts (2.0 mol) of formaldehyde, in the form of a 50% strength aqueous solution, 4 parts of ethylenediamine, 30 parts of water and 50 parts of methanol was added and the pH was brought to 5.8 with 20% strength aqueous sodium carbonate solution. The reaction mixture was then subjected to postcondensation for 1 hour at 70° C. The pH of the aqueous solution of the urea/formaldehyde resin modified with polyethyleneimine was brought to 6.2. An aqueous solution having a solids content of 35% was obtained.

EXAMPLE 2

Example 1 was repeated with the sole exception that a 39% strength aqueous solution of a partially hydrolyzed N-vinylformamide polymer which contained 45 parts of vinylamine hydrogen sulfate units and 55 parts of N-vinylformamide units was used. This gave a roughly 30% strength aqueous solution of a urea/formaldehyde resin modified with a partially hydrolyzed N-vinylformamide polymer. This aqueous solution of the resin had a viscosity of 130 mPa.s (measured at 20° C.; Brookfield 20 rpm).

EXAMPLE 3

Example 1 was repeated with the sole exception that a 30% strength aqueous solution of a polyvinylamine having a K value of 28 was used as the compound containing polymerized vinylamine units. A 29% strength aqueous solution of a urea/formaldehyde resin modified with polyvinylamine was obtained, the said solution having a viscosity (Brookfield, 20 rpm) of 146 mPa.s at 20° C.

EXAMPLE 4

The aqueous resin solutions obtained according to Examples 1 to 3 and the Comparative Example were tested as assistants in papermaking. For this purpose, a suspension of a bleached softwood sulfite pulp having a consistency of 0.5%, a pH of 4.5 and a freeness of 30° SR (Schopper Riegler) was first prepared. The cationically modified urea/formaldehyde resins, in the form of the aqueous solutions, were then added to this fiber suspension in an amount of 1% (solids), based on dry paper stock. Sheets measuring 283.5 $cm^2$ and having a basis weight of 80 $g/m^2$ were produced from this paper stock. The properties shown in the Table were measured for the sheets thus obtained.

The dry breaking length were (sic) determined according to DIN 53 112, Sheet 1, and the wet breaking length according to DIN 53 112, Sheet 2. The whiteness of the paper sheets was determined using a reflectometer (Elrepho), in accordance with DIN 53 145. The formaldehyde emitted in each case during drying of the sheets was collected in water and determined by colorimetry.

TABLE

| Resin prepared according to Example | Formaldehyde emission μg/sheet | Dry breaking length in meters | Wet breaking length in meters | Wet breaking length after aging of the paper (5 min, 130° C.) in meters | Whiteness % R[1] |
| --- | --- | --- | --- | --- | --- |
| 1 | 119 | 2723 | 400 | 498 | 84.43 |
| 2 | 144 | 2694 | 433 | 562 | 83.68 |
| 3 | 146 | 2664 | 441 | 573 | 83.0 |
| Comparative Example | 238 | 2736 | 483 | 681 | 82.58 |

[1]R = Reflectance

We claim:

1. A process for making paper having high dry and wet strength, which comprises adding to paper stock before sheet formation or applying to a surface of a paper sheet, a cationic urea/formaldehyde resin produced by condensing urea and formaldehyde in molar ratio of from 1:1.5 to 1:3 in the presence of polymers which contain not less than 1 mol % of polymerized vinylamine units and have K values of from 5 to 300 (determined according to H. Fikentscher in 5% strength aqueous sodium chloride solution at 25° C. and at a polymer concentration of 1% by weight), in an amount of from 5 to 50 g, based on 1 mole of urea in the end product, where the mixture is first:

a) precondensed at a pH of from 8 to 14, then acidified, and b) concondensed at a pH of from 1 to 5 until gel formation begins, c) then 0.3 to 1.5 moles of formaldehyde are added per mole of urea used, d) post-condensation is carried out and e) the resin solution is subsequently neutralized.

2. The process of claim 1, wherein for the cationic urea/formaldehyde resin, said polymerized vinyl amine units have the formula:

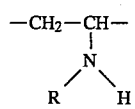

where R is H or $C_1$–$C_6$-alkyl.

3. The process of claim 1, wherein cationic urea/formaldehyde resin has a K value of from 15 to 150.

4. The process of claim 1, wherein said cationic urea/formaldehyde resin contains structural units of the formula:

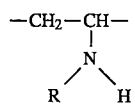

where R is H and which resin has a K value of from 20 to 95.

5. The process of claim 1, wherein the polymer containing vinylamine units is obtained by:
   a) copolymerizing from 1 to 99 mol % of N-vinylamides and from 99 to 1 mol % of vinyl acetate, vinyl propionate, $C_1$–$C_4$-vinyl ethers, ethylene, esters, nitriles or amides of acrylic acid or methacrylic acid, N-vinylpyrrolidone or mixutes thereof, and
   b) subsequently hydrolyzing amide groups of poymerized untis produce in step a) to produce amino gorups.

6. The process as claimed in claim 5, wherein said N-vinylamides are selected from the group consisting of N-vinylformamide, N-vinyl-N-methylformamide, N-vinylacetamide, N-vinyl-N-methylacetamide, N-vinylpropionamide and N-vinylbutyramide.

7. The process as claimed in claim 5, wherein from 10 to 90 mol % of N-vinylamides are used.

8. The process as claimed in claim 5, wherein in step a) a pH of from 9 to 11 is used.

9. The process as claimed in claim 5, wherein in step a), said urea and formaldehyde are precondensed at a temperature of from 60° to 100° C.

10. The process as claimed in claim 5, wherein in step b), said urea and formaldehyde are condensed at a pH of from 2 to 4.5.

11. The process as claimed in claim 5, wherein in step b), said urea and said formaldehyde are condensed at a temperature of form 60° to 100° C.

12. The process as claimed in claim 5, wherein in step d), said post-condensation is effected at a temperature of from 60° to 100° C.

* * * * *